United States Patent [19]

Tjahjadi

[11] Patent Number: 5,070,514

[45] Date of Patent: Dec. 3, 1991

[54] METHOD AND APPARATUS FOR CLEARING DATA PATH IN HALF DUPLEX MODEM RECEIVER WHILE MAINTAINING DYNAMIC PARAMETERS

[75] Inventor: Taruna Tjahjadi, Duluth, Ga.

[73] Assignee: Hayes Microcomputer Products, Inc., Norcross, Ga.

[21] Appl. No.: 454,180

[22] Filed: Dec. 21, 1989

[51] Int. Cl.$^5$ .............................................. H03H 7/30
[52] U.S. Cl. ...................................... 375/14; 375/104
[58] Field of Search ...................... 375/8, 14, 13, 104, 375/103, 99; 364/724.03, 724.02, 825, 724.1, 724.2; 329/318, 321; 455/223

[56] References Cited

U.S. PATENT DOCUMENTS

4,044,307 8/1977 Borysiewicz et al. .............. 375/8 X
4,894,847 1/1990 Tjahjadi et al. ........................ 375/8

Primary Examiner—Benedict V. Safourek
Assistant Examiner—Tesfaldet Bocure
Attorney, Agent, or Firm—Jones, Askew & Lunsford

[57] ABSTRACT

A DSP receiver for a fast turnaround modem, particularly suited for a half duplex fast turnaround modem which prevents destruction of communication channel related adaptive equalizer parameters upon loss of carrier. Upon detection of carrier loss, after sufficient time has been allowed for the last informational data bits to pass through the receiver's adaptive equalizer, the output of the equalizer's FIR filter delay line is looped back, via a multiplexer, to the input of the equalizer so that communications channel related samples are continuously provided to the equalizer to maintain the parameters at values based on the receiver's actual experience with data transmitted through the communications channel to which it is connected. A delay timer responsive to the loss of carrier signal will terminate updating of the adaptive equalizer parameters a predetermined time after loss of carrier. Alternately, detection of a standard end of data flag in the data stream will also terminate parameter update.

14 Claims, 2 Drawing Sheets

Fig_1

METHOD AND APPARATUS FOR CLEARING DATA PATH IN HALF DUPLEX MODEM RECEIVER WHILE MAINTAINING DYNAMIC PARAMETERS

TECHNICAL FIELD

The present invention relates to receivers for modulators/demodulators (modems) employing digital signal processing techniques and in particular is an improved method of operating, and apparatus for, a DSP implemented modem receiver employing an adaptive equalizer for use in a fast turnaround half duplex modem.

BACKGROUND OF THE INVENTION

In the last decade, modems have become virtually ubiquitous data communications devices in the western world as the use of small, inexpensive general purpose computers has spread into offices and homes. The proliferation of inexpensive computers has led to a like proliferation in the uses to which they are put, including transfers of substantial collections of data via modem over the public switched telephone network. Both technology and the marketplace are driving modem designs toward higher bit rates and modems have become quite price competitive.

In many applications, high data rates are desired, but only needed for short periods of time, or only in one direction of communication over the telephone link. For example, a wide variety of literature is reproduced on mainframe computers and made available for searching to persons doing research in areas to which the literature is pertinent. This use usually requires a relatively small amount of data traffic going from the user's data terminal equipment to the mainframe computer in order to execute the searching instructions to find relevent documents. When the time comes for the user to examine the documents in question, it is often desirable to transfer, or download, substantial blocks of textual data representing the articles themselves. These are often saved to disk and reviewed at a later time when the user is not encountering connect time charges.

In order to fully exploit the available bandwidth of a standard voice grade telephone line on the public switched network, very sophisticated signal processing schemes must be employed. For example, a modem constructed according to CCITT Recommendation V.32 requires complex echo cancelling devices to be employed in order to effectively allow bidirectional, full duplex communication in which transmission in each direction occupies the same frequency spectrum available in the telephone channel.

For a number of years it has been recognized that half duplex modems, in which communication proceeds only in one direction at any given time, have the advantage of allowing the full bandwidth to be available for unidirectional communication. Therefore, for a given available bandwidth and unidirectional data transmission speed, a half duplex modem is normally less expensive than a full duplex modem having bidirectional simultaneous data communications capability at the same bit rate. However, half duplex modems require a handshaking or control scheme to allow the channel to turn around. Many users of publicly available data bases are familiar with the inconvenience of using half duplex modems in which it is not uncommon to encounter a situation where a host computer will commence sending a large block of data which the user would like to interrupt, but is unable to do so until the transmitting modem releases the channel to allow the remote user to send data back to the host.

Additionally, as modems have gone to higher data communications rates, and the costs of powerful microprocessors and other digital electronic components have dropped, it is becoming much more common for modems to employ digital signal processing (DSP) techniques in their implementation. As voice grade telephone line modems are driven to higher speeds, they are likewise driven to data communications protocols with more crowded encoding constellations. It is well known to those skilled in the art that most modern medium speed modems employ communications protocols in which changes in the relative phase and amplitude of a carrier signal are used to encode multiple data bits during any given keying interval or baud time. The baud rate is the fundamental keying rate or symbol rate of a modem. The number of bits encoded per symbol will reflect the density and complexity of the signal constellation. The constellation is graphically represented by a series of points in a Cartesian plane where the angle from a given reference axis (normally the positive X axis) represents a relative phase for a particular symbol and the distance from the origin represents the normalized amplitude of the carrier for the symbol. Since there must be a discrete point in the phase plane for each possible symbol, the number of points in the phase plane increases geometrically with the number of bits per baud. In other words, if N bits are encoded in each symbol, there must be $2^N$ points in the signal constellation.

Naturally, given noise and frequency limitations of a standard voice grade telephone channel, there is a limit to the range of amplitudes available in a signal constellation. Thus, as the number of bits per symbol increases, the signal constellation becomes more crowded and the distance between neighboring points in the constellation is reduced. As this occurs, there is an increased likelihood of error due to a modem receiver incorrectly decoding a constellation point as being one of the near neighbors of the point actually transmitted.

In recent years, a number of arrangements have been employed to overcome this limitation. The two most common mechanisms are the use of trellis encoding schemes and adaptive equalizers. Trellis coding refers to a genus of encoding schemes which algorithmically and dynamically, based on the sequence of recently sent symbols, change the data significance of particular points in a signal constellation. Simply stated, trellis encoding schemes assure that sequential constellation points actually transmitted by the modem will be separated by a large Cartesian distance in the constellation phase plane. The use of trellis encoding schemes has been mathematically shown to provide an improvement which may be quantified as an equivalent improvement in signal to noise ratio on the communciations channel.

Adaptive equalizers are digital signal processing devices which dynamically adjust phase and amplitude response of a modem's receiver channel in order to compensate for dynamic changes in the overall phase and amplitude transfer function of the communications channel. Simply stated, an adaptive equalizer measures an error signal during the decoding processing and makes adjustments in its own phase and amplitude response to offset the errors in the phase and amplitude of the received signal. In other words, when a received signal at the center of a baud time is decoded to a particular constellation point, the decoding process determines the particular one of the defined constellation points to which the received constellation point is closest. The difference between the phase and amplitude value of the received point and that for the defined point is an error quantity. This information is used to adjust the phase and amplitude response of the dynamic equalizer so that the next receipt of the same signal would be decoded to be exactly (within the limitations of quantitazation error and the like) at the phase and amplitude location of the defined constellation point.

Naturally, the rate at which such parameters are updated in an adaptive equalizer is selected to give the best tradeoffs in actual operating characteristics. Like any multiple order feedback device, too much gain in the equalizer will tend to cause its characteristics to exhibit the characteristics of an under damped mechanical system in which there is overshoot and undershoot in searching for the correct point. Too slow a response time for the adaptive equalizer may be likened to an over damped system in which the equalizer will respond too slowly to compensate for changes in the transmission channel transfer function.

This leads to an understanding of one of the main drawbacks of high density constellations employed in modem communications. All of the digital processing devices, and in particular adaptive equalizers, require a finite amount of time in which to adjust to the signal conditions actually encountered on the line. In practice, it is common to initialize or train such devices by predetermined rules for sending known bit sequences so that the DSP elements will become adapted to the communications channel actually being used. This is normally referred to as a training sequence. The time it takes a given DSP receiver to become properly locked on to the conditions of the channel is referred to as the training time.

Putting all of the constraints and motivations described hereinabove together will lead to a full understanding of the following. In order to make relatively low cost high speed modems, particularly suitable for applications in which high speed communication is normally required in only one direction, several manufacturers have introduced non-standardized communications protocols. The most popular in the United States is that employed by the Hayes V-Series Smartmodem 9600 brand modem. This particular modem is a fast turnaround half duplex 9600 bit per second device which employs the signal constellation and the trellis encoding arrangement defined in CCITT Recommendation V.32, which Recommendation pertains to full duplex 9600 bit per second modems. Significant inventive work was required in order to design a device which could turn the channel around fast enough, and have the required training sequences for the DSP receivers to be of short enough duration so that the modem would, in many pratical applications, appear to be full duplex to the user. The basic design of the Hayes V-Series Smartmodem 9600 brand device which allow it to achieve these operating goals are described in U.S. Pat. No. 4,894,847, issued Jan. 16, 1990 entitled "High Speed Half Duplex Modem With Fast Turnaround Protocol" assigned to the assignee of the present invention. Said U.S. Pat. No. 4,894,847 is hereby incorporated by reference.

Another arrangement which has been employed is that of a full duplex asymmetrical modem. While generically such devices have been known for a number of years, the HST modems manufactured in the United States by U.S. Robotics Corporation are an example of this type of device. An asymmetrical modem is not a true half duplex modem but one in which there is a relatively high speed channel going in one direction and a relatively low speed channel going in the other, for example 9600 bits per second and 300 bits per second, respectively. The U.S. Robotics HST modem is designed so that the directional significance of these channels may be turned around at a relatively high speed, thus dynamically changing which communicator on the telephone link has the high speed channel and which has the low speed channel.

In order to overcome the constraints of relatively long training times in DSP implemented modems, it is known to those skilled in the art to freeze, or terminate updating of certain dynamically adjusted operating parameters in the digital signal processing path. U.S. Pat. No. 4,621,366 to Cain et al. shows a DSP modem which stores previously acquired parameters and coefficients when the channel is turned around, and upon the reestablishment of operation of the receiver, resets the DSP equalizer with the stored coefficients and provides a shortened retaining sequence. This arrangement allows for shortened training times after channel turnaround since the stored coefficients are based on data derived from the physical attributes of the communications channel which are very unlikely to have changed significantly in the time which elapses between successive operations of the receiver.

Also, it is known in the art to, upon a given set of conditions, terminate the updating of adaptive equalizer parameters. This approach is predicated on the assumption (normally a good one) that the adaptive equalizer will have learned something about the actual physical channel over which it is communicating during the time it is operated. Rather than reset the equalizer parameters to zero when the receiver is turned off, for example when a channel is turned around in a half duplex modem, the modem will maintain the coefficients which define the operating parameters of the equalizer once data reception has terminated. When the channel again turns around, the adaptive equalizer will still be in the same state at the time its receiver was cut off. U.S. Pat. No. 4,669,090 to Betts et al. shows such a modem. Operating the receiver in this manner causes the equalizer to start from a known set of coefficients. These coefficients will be very close to the actual ones it will need as it again commences the receipt of data since these coefficients are based on its experience with the characteristic of the telephone communication channel currently in use, and these characteristics typically change at a slow rate.

However, there are a couple of potential drawbacks which have to be offset in employing such an arrangement. First, by its very nature, the termination of operation of parameter update in an adaptive equalizer halts the flow of data through the device. In other words, there is no way to terminate the operation of the adaptive characteristic of the equalizer and still pass data through it. Therefore, it is necessary to provide an additional period of received signal, over and above that containing the data actually being received, in order to allow the received data itself to pass through the equalizer and on through the other components of the DSP signal path, to the point at which it is finally decoded and passed on to a utilization device. In the present specification, the additional period of the received signal will be referred to as the "flush time" which is required to clear the useable received data through the digital signal processor.

As is known to those skilled in the art, the transmitted signal for the flush time is necessary both to flush the informational received bits from the digital signal processing path as well as to give a stream of "real samples" to the adaptive equalizer so that it will not simply start responding to the noise on the line when the carrier signal is terminated. In other words, if one simply turns off the carrier after the last informational bit is sent, the DSP path and the receiver will have to continue to operate for at least the flush time in order to make sure that all of the informational bits pass through the receiver and on to the utilization device. When this is done, the adaptive equalizer will have started to respond to the noise in the absence of carrier when the channel is being turned around, and the dynamically adjustable parameters will move quickly to values which are quite different from those which were established during operation of the receiver while a carrier signal was on the line.

The transmitter of the modem described in the above referenced U.S. Pat. No. 4,894,847 has been designed to provided to provide a 15 millisecond flush time of continued carrier on the channel after transmission of the last data bits before the carrier is cut off and turnaround of the channel commences. However, the flush time simply adds to the turnaround time for the channel in a half duplex fast turnaround mode. If the flush time is made arbitrarily long, then the turnaround time becomes unacceptably long.

Therefore, it will be appreciated that there is a problem in the design of high speed turnaround half duplex modems employing DSP receivers which arises in two contexts. There is the need to provide additional carrier on times after transmission of the last useable data bits in a given direction in order to maintain the adaptive equalizer in an operating condition which responds to the actual telephone communication channel in order to be able to freeze these parameters when the channel is turned around. As noted above, the modem of the above cited U.S. patent uses a 15 millisecond flush time in order to flush the DSP in the receivers of like modems. The present invention arose in the context of an improved DSP receiver for use in a modem of the type described in the 4,894,847 patent. Certain improvements to the DSP receiver led to and end-to-end delay time between the analog input to the receiver and its final decoded output which was in excess of 15 milliseconds. Thus, the 15 millisecond flush time of the already established communciations protocol was insufficient to assure maintenance of the dynamic operating characteristics of the DSP receiver in accordance with the statistics of the telephone line in use.

Therefore, the need for the present invention arises in the environment of any modem in which it is desired to freeze or maintain dynamic operating parameters of the digital signal path when a receiver is turned off. The most common application in which this condition is encountered is in a fast turnaround half duplex modem. The need arises when either there is no particular arrangement made for continued carrier to provide a flush time, or, as in the case of the necessity which was the mother of the present invention, one in which there was an existing established communications protocol setting a flush time of continued carrier, which flush time was less than the end-to-end delay time of the DSP receiver apparatus.

It will be quickly appreciated by those skilled in the art that these are simply two aspects of the same generic problem: how to keep the adaptive equalizer parameters responding to actual conditions on the telephone link after the termination of transmission of informational bits prior to turning the channel around. The problem must also be understood in the context of the unacceptability of providing and arbitrarily long extension of carrier which will slow down the turnaround time to an unacceptable degree.

Thus, there is a need in the art of digital signal processing modems to provide apparatus which can maintain the dynamic operating parameters of an adaptive equalizer in a state which is based on the actual transfer function of the communication link at a time when the receiver is being turned off, and allow such parameters to remain fixed until the next time the receiver is activated.

SUMMARY OF THE INVENTION

The present invention provides a solution to the above stated problem by providing, after the loss of carrier, the input of a DSP adaptive equalizer with digital samples representing, or closely approximating, digitized representations of signals which actually pass through the data communications channel. Generally stated, the present invention in an apparatus which responds to loss of carrier to provide a source of channel derived data to the input of an adaptive equalizer until flushing of the DSP channel is completed. When this occurs, the dynamic parameters of the adaptive equalizer are maintained at their present values until the next time the carrier is detected and the receiver is reactivated. In the preferred form of the present invention the source of the channel related data is the output of the equalizer's delay line. In other words, the output of the equalizer's delay line is fed back into the input in order to maintain operation of the equalizer on samples which were derived from signals actually passed through the channel, until the DSP path is completely flushed.

In the present invention, there are two essentially independent alternative conditions which can signal termination of this operation and indicate that it is time to cease updating of the dynamic parameters of the equalizer. One such condition is the passage of a predetermined period of time after loss of carrier which is known, under the data communications protocol in use, to be sufficient to assure flushing of the channel. The second is detection, at the far end of the receiver, of a standard end of data flag which indicates to the modem that the last informational bits have been received and processed. When the end of data flag is detected, this indicates that the modem has received all of the informational data bits transmitted by the far end modem during this particular session of receiver operation and it is time to turn off the receiver and freeze the adaptive equalizer parameters until the receiver is reactivated.

In the preferred embodiment of the present invention, these are alternative conditions and the first of either one of them to occur will cause freezing of the adapter parameters. However, it will be understood by those skilled in the art that embodiments of the present invention may be constructed which provide the fed back data either for a fixed period of time after carrier loss or during the interval between carrier loss and receiver decoding of the end of data flag.

The preferred embodiment of the present invention implements the feedback path through a digital multiplexer which simply feeds the normal output from an interpolative filter through the multiplexer to the input of the adaptive equalizer during normal operations. A fast carrier detector is provided at the output of the receiver's analog-to-digital converter. When the fast carrier detector detects a loss of carrier signal condition, the multiplexer is switched to a state in which it feeds signals from the adaptive equalizer's delay line back to the equalizer's input. This condition is maintained until either of the above referenced events occurs: (a) passage of a predetermined period of time after carrier loss; or (b) detection by the receiver of the standard end of data flag.

In the preferred embodiment of the present invention a Viterbi decoder is used between the adaptive equalizer and a standard descrambler. The Viterbi decoder may be thought of as the device which introduces the additional delay time which led to the need for the present invention, in the environment in which it was made.

In the preferred embodiment, the predetermined delay between loss of carrier and termination of adaptive equalizer feedback and freezing of equalizer parameters is simply made to be longer than the difference between the end-to-end delay time of the DSP receiver and the fixed flush time of carrier provided in the data communications protocol in use. This statement is generally applicable to embodiments of the present invention even when no additional carrier flush time is provided in the protocol so long as the actually transmitted bits representing the end of data flag have been given sufficient time to pass through the equalizer. In other words, it is unwise to start looping back the output of the equalizer delay line to the equalizer input until one is sure that all of the useable transmitted information from the far end modem has passed through the equalizer on to the down stream decoder and descrambler devices.

It will therefore be appreciated that it is an object of the present invention to provide an improved digital signal processing receiver for a modem which allows maintenance of adaptive equalizer parameters at values based on channel related data even when the end-to-end delay time of the DSP receiver exceeds that of the allowed flush time of continued carrier after termination of transmission of information bits defined by the communications protocol in use.

It is a further object of the present invention to provide an improved digital signal processing receiver which allows upward and backward compatibility of a complex DSP receiver having an end-to-end delay greater than flush times provided in a given fast turn-around data communications protocol which will keep required training times upon channel turnaround to a minimum.

That the present invention satisfies these objects, and solves the problem presented hereinabove will be appreciated from the following description of the preferred embodiment.

DETAILED DESCRIPTION

Turning to the drawing figures, the preferred embodiment of the present invention will be described. It should be understood that, as is the case with virtually all digital signal processing devices, the apparatus is designed and represented by blocks which are indicative of discrete components. In practice, implementation of the apparatus is accomplished by deriving the appropriate mathematical descriptions for these blocks and encoding same into control instructions driving a digital signal processing microprocessor.

Figure 1:
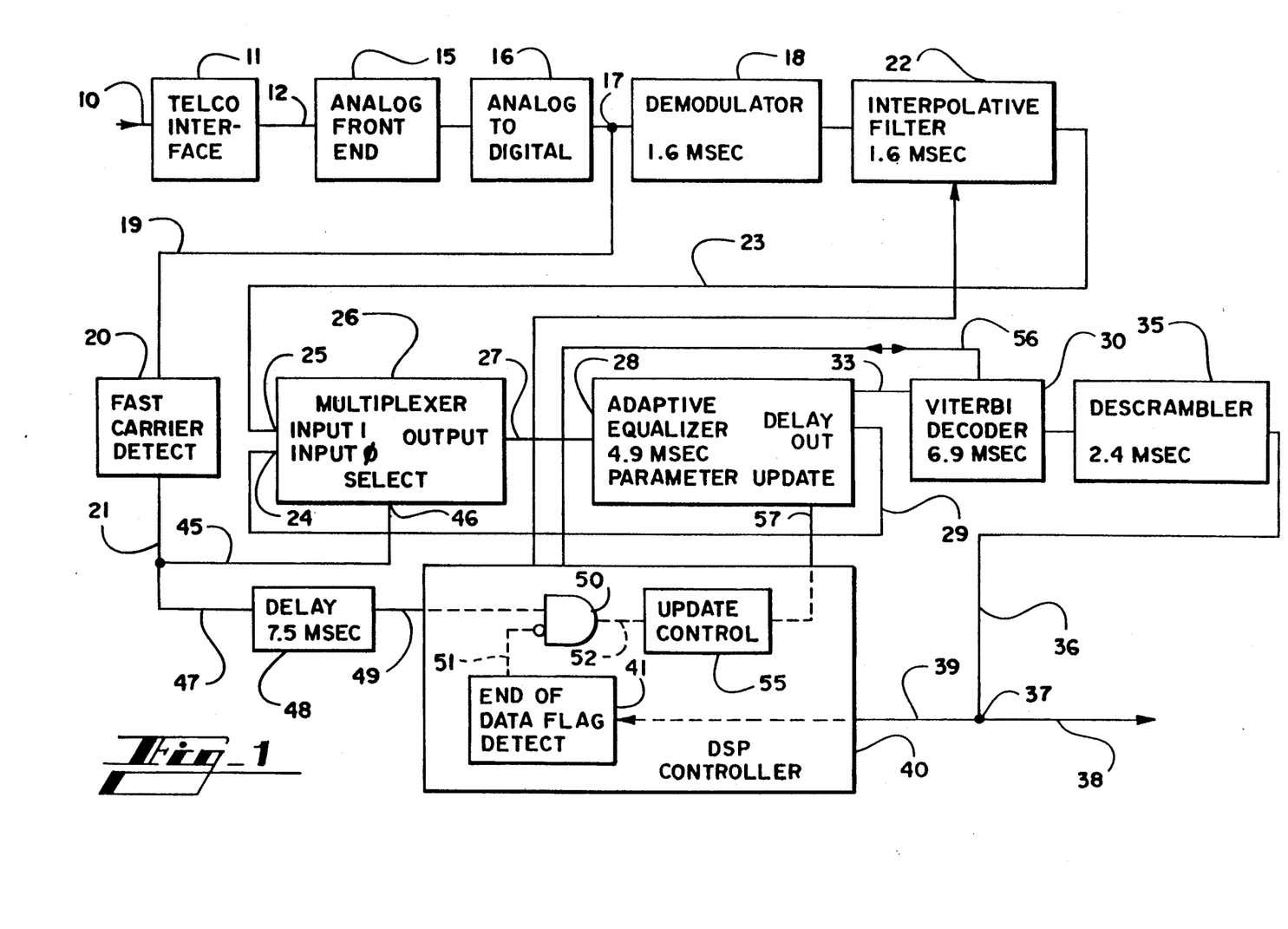
FIG. 1 is a block diagram of the preferred embodiment of a digital signal processing receiver for a modem embodying the present invention.

With that in mind, the preferred embodiment will now be described in connection with FIG. 1. The receiver is connected to a telephone line 10 through a conventional telco interface 11, the nature of which will be well known to those skilled in the art and does not need further description. Signals from the telco interface pass out over line 12 to the modem's analog front end 15 which, conventionally, includes the analog receiver filters for the modem. Output from the analog front end is passed to an analog-to-digital converter 16, the output of which appears at point 17 where it is provided as the input to a DSP demodulator 18. The output of A to D converter 16 is also provided over line 19 to a fast carrier detector 20. Carrier detector 20 is referred to as a fast carrier detector in that it is an underdamped filter for the amplitude of the signal at the carrier frequency for quickly detecting loss of carrier on the phone line. In the preferred embodiment the fast carrier detector is implemented so that it will respond with a carrier loss signal condition output on line 21 within 3 milliseconds of the signal within the carrier bandwidth dropping 12 dB. The preferred embodiment fast carrier detector 20 is simply a narrow bandwidth digital filter.

The output from demodulator 18 is passed on to interpolative filter 22 which will be understood by those skilled in the art to essentially be a variable delay line. It will be appreciated by those skilled in the art that interpolative filter 22 is necessary in the preferred embodiment only because analog-to-digital converter 16 is a type having a fixed frequency sampling clock. Therefore interpolative filter 22 acts as a varible delay line which allows the receiver to lock on to the baud interval timing of the received signal in a conventional manner. Alternate embodiments of DSP receivers are well known to those skilled in the art in which this same function is accomplished by varying the sampling time at the receiver's analog-to-digital converter. In such receivers an interpolative filter is not necessary. Naturally, embodiments of the present invention can be constructed using variable period sampling clocks in the DSP receiver analog-to-digital converter which omit an interpolative filter.

The output from the interpolative filter appears on line 23 as one input, at 25, to a digital multiplexer 26. The output from the multiplexer appears on line 27 as the input to adaptive equalizer 28. The output from adaptive equalizer 28 appears on line 33 where it is provided as input to Viterbi decoder 30. A second output from adaptive equalizer 28 is provided on line 29 back to the other input 24 of multiplexer 26. The output on line 29 is, in the preferred embodiment, the output from the last stage of the delay line internal to adaptive equalizer 28. As explained in greater detail hereinbelow in connection with FIG. 2, the output on line 29 will be temporally synchronized with the output on line 33 but the samples provided on line 29 will be delayed samples which have not been filtered by adaptive equalizer 28.

Those skilled in the art will recognize the Viterbi decoder as the decoder which decodes the constellation points for the signals at the centers of baud times as well as performing the inverse of the trellis encoding function used in the CCITT Recommendation V.32 scheme of the present invention. The output from the Viterbi decoder is passed on to a conventional digital descrambler 35, the output of which appears on line 36 which takes it to point 37. From point 37, output continues on down stream on line 38 to a microprocessor basded controller (not shown) which, in turn, sends the data to the DCE/DTE interface of the modem. It is also provided on line 39 as an input to DSP controller 40 shown at the bottom of the drawing figure.

It will be understood by those skilled in the art that DSP controller 40 respresents the control portion of the digital signal processor used in a DSP modem receiver. In practice it is implemented as a portion of the code driving the entire DSP microprocessor. In practice it provides the functions which both receive and interpret information from various components of the digital signal processor and provides dynamically variable parameters back to certain elements in the DSP signal processing path, including adaptive equalizer 28.

Within the block representing DSP controller 40, the extensions of input and output lines are shown as dotted lines to components within the controller. The signal on line 39 is provided to an end of data flag detector 41 which simply represents code used to detect a standard end of data flag defined by the communciations protocol in use. In the preferred embodiment of the present invention the HDLC protocol is used which prohibits the transmission of a sequence of bits having more than five sequential 1's. The end of data flag is a bit sequence which includes six consecutive bits and thus may be detected as an otherwise illegal signal having the characteristics of a dedicated link control code.

It will be appreciated by those skilled in the art that omission of multiplexer 26 and a direct connection on line 25 to line 27 would cause the digital signal processing path proceeding from A to D converter 16 through demodulator 18, interpolative filter 22, adaptive equalizer 28, Viterbi decoder, 30, and descrambler 35 to represent an otherwise conventional DSP processor in a modem receiver. Thus, it is the addition of multiplexer 26, fast carrier detector 20 at the position shown, and certain elements within DSP controller 40 which constitute the non-conventional devices shown in the receiver of the preferred embodiment which caused the receiver to constitute an embodiment of the entire subject matter of the present invention.

The output of fast carrier detector 20 which appears on line 21 is provided both on line 45 to a select input 46 of multiplexer 26 and on line 47 as the input to a delay timer 48, the output of which appears on line 49 as an input to DSP controller 40. In the drawing figure, the output on line 21 should be considered as having positive logic, in that a logical 1 condition exists on line 21 when a carrier in the signal on line 12 is detected, and represented in the digital samples provided at point 17 in the output of A to D converter 16. Therefore, line 21 will go to a logical 0 state when carrier is lost. This will switch the select input 46 of multiplexer 26 from a state in which it provides the signals present at its 1 input, shown at 25 in the drawing, to the output on line 27 to state in which it provides the signal at its 0 input 24 to the output on line 27.

Delay timer 48 simply delays the 1 to 0 transition on line 47 by 7.5 milliseconds, after which time it will appear on line 49. It will be appreciated by those skilled in the art that delay timer 48 may be considered a device which commences timing of a predetermined time interval, 7.5 milliseconds, upon the provision of a loss of carrier signal condition represented by the transition on line 21. It provides an output on line 49 7.5 milliseconds after the loss of carrier signal condition occurs.

The output from end of data flag detector 41 is provided on line 51 to a negated input for AND gate 50. It will be understood by those skilled in the art that AND gate 50 represents a logical ANDing function performed by the DSP processor and is not meant to imply the physical presence of an integrated circuit AND gate device or the like. The other input to AND gate 50 is provided from line 49. The output from the gate appears on line 52 as an input to update controller 55.

From inspection of the drawing figure, it will be appreciated that AND gate 50 represents a positive logic function in the following manner. The signal on line 47 is the output of fast carrier detector 20 and thus should be considered to carry a logical 1 when a carrier is present. Delay element 48 delays the logical condition on line 47 from appearing on line 49 by 7.5 milliseconds. Therefore, when carrier is lost, a logical 1 to 0 transition takes place on line 49 7.5 milliseconds after the detection of carrier loss by detector 20. This forces the output of AND gate 50, which appears on line 52, low which then terminates operation of update controller 55. Thus, a logical 1 on line 52, the control input to update controller 55, will cause DSP controller 40 to continue to update the parameters of adaptive equalizer 28.

Similarly, the output on line 51 from end of data flag detector 41 represents positive logic. Under normal conditions of data receipt, no end of data flag will be detected and line 51 will be providing a logical 0 to the inverted input of AND gate 50 which allows the output of AND gate 50 to remain at a logical 1. When the end of data flag is detected, line 51 goes high forcing the output of AND gate 50 low, terminating operation of update controller 55.

Update controller 55 represents the functions in DSP controller 40 which provide the dynamically changing parameters to adaptive equalizer 28. While not all of the functional connections among the blocks of the DSP receiver are shown, line 56 is shown as a bidirectional signal path between Viterbi decoder 30 and DSP controller 40. It will be understood by those skilled in the art that this indicates that information is passed from the Viterbi decoder 56 back to the DSP controller representing the results of the decoder's work, including the error signals generated by constellation decoding functions of the decoder described in the Background of the Invention section hereinabove. This information is used by DSP controller 40 and passed to update controller 55, the output of which appears on line 57. Those skilled in the art will recognize that the use of individual lines on the drawing figure does not in any way imply a single electrical conductor, but indicates the flow of information among the various blocks of the DSP processor.

Having described the structure of the processor, the operation of the preferred embodiment will now be described. As noted hereinabove, the preferred embodiment is designed to be used in a modem employing a communications protocol which provides a 15 millisecond flush time of additional carrier after transmission of the end of data flag by the transmitting modem. Within the blocks denoting several devices in the drawing figure are notations indicating the input to output time delay for each device. For example, demodulator 18 and interpolative filter 22 in the preferred embodiment each introduce about a 1.6 millisecond delay. Thus, there is an approximately 3.2 millisecond delay between point 17 and line 23. Adaptive equalizer 28 introduces a 4.9 millisecond delay and the Viterbi decoder has a 6.9 millisecond delay. Descrambler 35 introduces an additional 2.4 millisecond delay.

Since the multiplexer is virtually instantaneous, being only a device for selecting data, it will be appreciated that the end-to-end delay of the DSP processor of the preferred embodiment between point 17 and line 36 is approximately 17.4 milliseconds. This is 2.4 milliseconds longer than the flush time provided in the Hayes V-Series Smartmodem 9600 data communications protocol. Thus, operation of the apparatus without the improvements of the present invention under these circumstances should be considered. If this were the case, multiplexer 26 would not be in the digital signal processing path and one can quickly appreciate, from adding the delay times shown in the various components of the preferred embodiment, the following conditions would prevail. It should be borne in mind that discussions of what signals have arrived where in the DSP path refers to the processing of digitized samples. With the use of a standard 15 millisecond flush time, it will be quickly appreciated that there is approximately a 15 millisecond delay between point 17 in the output of Viterbi decoder 30. Thus, under these conditions the last samples representing the end of data flag would be exiting Viterbi decoder 30 when the loss of the carrier appeared in the digitized samples at point 17. This is because, under the communications protocol described, the transmitting modem will continue to send carrier for 15 milliseconds after transmission of the end of data flag. In 2.4 milliseconds, the end of data flag will pass through descrambler 35. In the meantime, digitized noise signals, which are noise due to the absence of carrier, are making their way through demodulator 18 and interpolative filter 22. Since the delay time in interpolative filer 22 is variable, the 3.2 millisecond delay between point 17 and line 23 represents a maximum delay.

If it is assumed that the end of data flag detector would operate almost instantaneously, it will be appreciated that the difference between the delay in the demodulator and interpolative filter exceeds that in the descrambler by only 0.8 milliseconds. Since the detector does not operate instantaneously, it will be appreciated that digital signals generated in response to the no carrier noise on the line will make their way into adaptive equalizer 28 and on to Viterbi decoder 30 prior to DSP controller dependably having time to place a signal on line 57 indicating that it is time to terminate the operation of parameter updating. If noise is provided to the equalizer and the decoder, the adaptive equalizer immediately starts responding to very large error signals and its parameters change rapidly in a direction which has no correlation with the desirable equalizer parameters when a signal is actually present on the line. This is the event which the present invention is designed to prevent.

Figure 2:
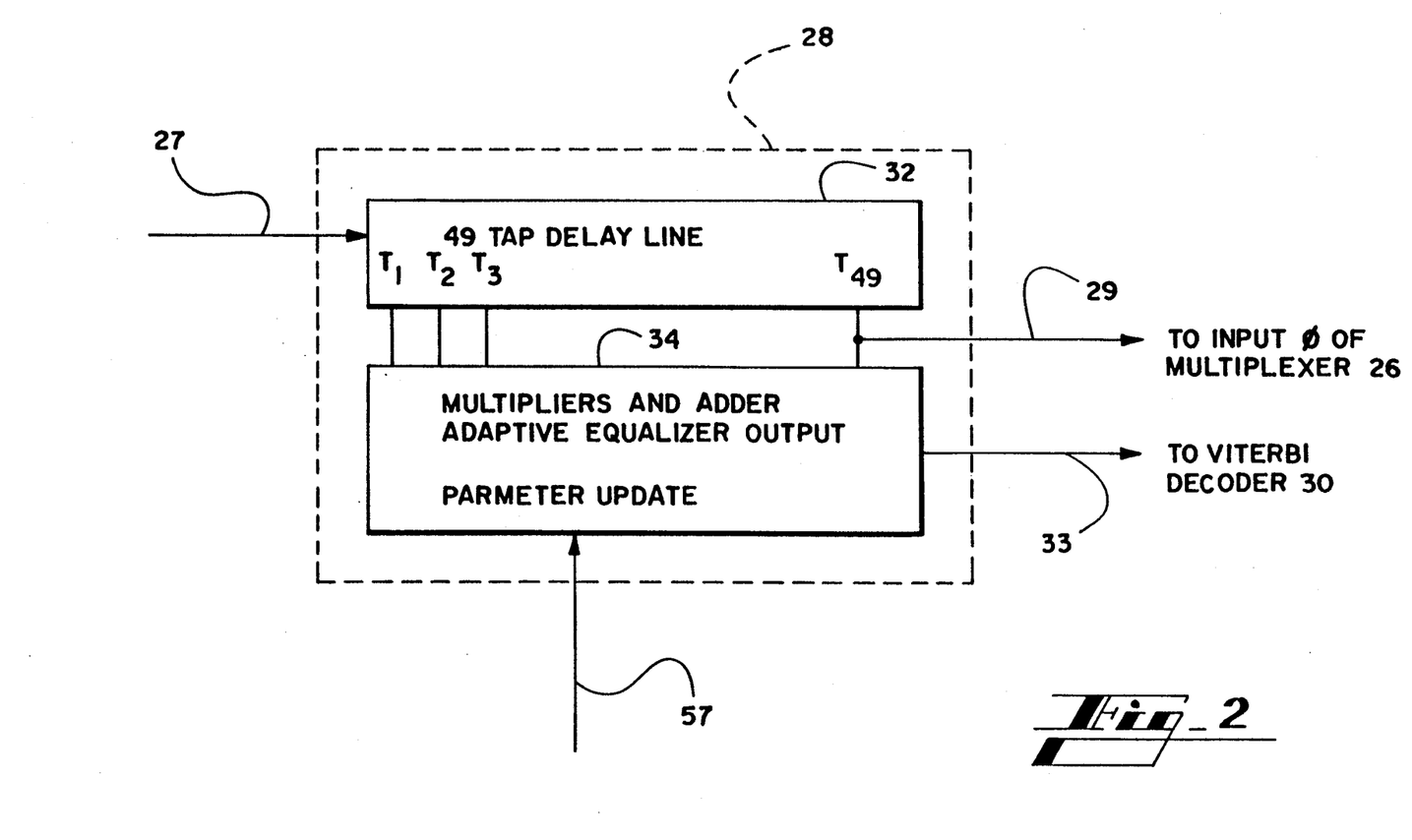
FIG. 2 is a block diagram of the adaptive equalizer of FIG. 1.

FIG. 2 is a simplified block diagram of the well-known internal structure of adaptive equalizers such as the preferred embodiment of adaptive equalizer 28. In the preferred embodiment of the present invention the adaptive equalizer is simply an adaptive finite impulse response digital filter. Those skilled in the art will recognize that such filters have a structure of a tapped delay line having multiple taps. The output of the filter, which appears on line 33 is simply a sum of products, each product consisting of one of the equalizers' coefficients times the value of a sample at a particular tap from the delay line. Thus the block of FIG. 2 represents the direct realization of the equation for an FIR filter. In such a realization, any delayed sample is available at any tap on the delay line. The preferred embodiment of the present invention taps the last (that is, the 49th) stage of delay line 32 and provides these samples as an output on line 29. The multipliers and adder represented by block 34, together with the parameter updating for changing the multiplier coefficients as controlled by the signal on line 57, provide filtered output on line 33.

From this it will be appreciated that the samples output on line 29 simply represent the digitized samples provided on line 27 delayed by 49 sampling periods, but otherwise unfiltered. The samples provided as output on line 33 are digital samples representing the sampled signal input on line 27, operated on by the FIR filter transfer function of adaptive equalizer 28.

When the preferred embodiment of the present invention is used, the following takes place. Since the delay between point 17 and line 33 is approximately 8.1 milliseconds, it will be seen that the 15 millisecond flush time provided by the data communications protocol is more than sufficient to cause the last digitized samples representing the end of data flag to clear the output of adaptive equalizer 28 prior to the time carrier is lost. When carrier is lost, fast carrier detector 21 causes a 1 to 0 transition to take place on line 21. This is passed by line 45 to the select input 46 of multiplexer 26 which then connects the delay line output of the adaptive equalizer on line 29 back through multiplexer input 24 on to line 27. This loops the output from the equalizer delay line back to its input upon loss of carrier. The result of this is that adaptive equalizer 28 continues to process digitized samples which were representative of legitimate signal conditions when carrier was present on the line. The signal looped back from line 29 to line 27 under these conditions are simply digitized samples of a channel related signal. Therefore, the multiplicative parameters of adaptive equalizer 28 will be responding to real samples provided over the communications channel and no operation of the filter of adaptive equalizer 28 will drive the parameters to change. Therefore, the parameters of the adaptive equalizer will still be based on the characteristics of the channel itself.

The detection of carrier loss represented by the transition on line 21 commences the timing of a predetermined time interval of 7.5 milliseconds by delay timer 48. 7.5 milliseconds after the loss of carrier, a like 1 to 0 transmission will appear on line 49 thus causing the ANDing logical function represented by gate 50 to pull line 52 low. This signals update controller 55 to output a signal on line 57 terminating updating of the adaptive equalizer parameters and freezing same at the then current values.

Since the communications protocol provides 15 seconds of flush time between transmission of the end of data flag and the turning off of the carrier signal, it will be appreciated that the transition on line 49 at the output of delay timer 48 will lag the appearance of the last bit of the end of data flag at point 17 by approximately 22.5 milliseconds. Since the end-to-end delay between point 17 and line 38 is 17.4 milliseconds, this is sufficient time to assure passage of the end of data flag out on line 38.

Additionally, as noted hereinabove, end of data flag detector 41 operates to provide a logical 1 output on line 51 when the end of data flag is detected. Since this is provided to an inverted input of AND gate 50, detection of the end of data flag will likewise cause a transition on line 52, signaling update controller 55 to freeze the adaptive equalizer parameters.

In practice, end of data flag detector 41 should be activated before the timeout of delay device 48 and thus one would normally expect the end of data flag detection to be the event which actually freezes the parameters of adaptive equalizer 28. However, if there is any error in detection of the flag, or if there is any momentary inadvertent carrier loss from which the modem will try to recover quickly, that is without going through an entire initialization and retraining sequence, then the delay timer 48 provides a backup mechanism for assuring freezing of the parameters.

From the foregoing description of the preferred embodiment, the following generalized nature of the present invention will be appreciated. As noted hereinabove, the need for the present invention arises when the end to end delay in the signal path of a modem receiver exceeds the flush time of excess carrier provided by the communications protocol in use. As also noted, this is particularly important in fast turnaround modems in which training time for the digital signal processor must be kept to a minimum each time operation of the receiver begins. The scope of the present invention may be understood by dividing the total input to output delay of the receiver into three segments $T_{D1}$, $T_{DEQ}$, and $T_{D2}$. The flush time of excess carrier provided by the communications protocol is referred to as $T_F$. Lastly, the delay between detection of carrier loss and termination of update of adaptive equalizer parameters is referred to as $T_{D3}$. The values for these parameters in the preferred embodiment, and their corresponding application to the drawing figure is summarized in the following Table 1.

TABLE 1

| Parameter | Path | Value in Preferred Embodiment (millisecond) |
|---|---|---|
| $T_{D1}$ | Point 17 to Line 27 | 3.2 |
| $T_{DEQ}$ | Line 27 to Line 33 | 4.9 |
| $T_{D2}$ | Point 29 to Line 38 | 9.3 |
| $T_{D3}$ | Line 47 to Line 49 | 7.5 |
| $T_{SW}$ | Line 21 to Input 46 | 0 |
| $T_F$ | Protocol Flush Time | 15 |

It should be noted that for purposes of this discussion the interpolative filter 22 is considered a part of the generic demodulator even though it is down stream from demodulator 18 shown in the drawing figure. As explained hereinabove, the function performed by interpolative filter 22 is often combined into the clocking signals for analog-to-digital converter 16 and thus it is proper to characterize the output of interpolative filter on line 23 as the demodulator output for a modem receiver.

The need for the present invention arises under circumstances in which the total end to end path delay from the demodulator input to the receiver output, $T_{D1}+T_{DEQ}+T_{D2}$ is greater than the flush time $T_F$. Under these circumstances, it is important that all the data be flushed from the receiver and it is further important that all of the useable data, including the bits of an end of data flag, pass into adaptive equalizer 28 before multiplexer 26 is switched to loop the delay line output of adaptive equalizer 28 back to its input on line 27. From these considerations, it will be understood by those skilled in the art that a machine will embody the present invention for overcoming the problem of an end to end delay time which exceeds additional carrier flush time if it satisfies the following three inequalities.

$T_{SW}>T_{D1}+T_{DEQ}-T_F$      Inequality (1)

$T_{SW}<T_{D1}$      Inequality (2)

$T_{D3}+T_F>T_{D1}+T_{EQ}+T_{D2}$      Inequality (3)

In the foregoing inequalities, the times are as defined in Table 1. It should be noted that $T_{SW}$ is zero in the preferred embodiment since the flush time exceeds combined delay times $T_{D1}+T_{DEQ}$. However, it is an important aspect of the present invention that $T_{SW}$ may be greater than zero if the delay from the demodulator input to the adaptive equalizer output ($T_{D1}+T_{DEQ}$) exceeds the flush time $T_F$. Thus, satisfaction of inequality 1 satisfies the physical requirement that all of the useable data signals be allowed to pass through to the output of the adaptive equalizer before the loop back of equalizer output to input is established. Satisfaction of inequality 2 satisfies the condition that no samples representing noise in the absence of carrier should be allowed to make their way to the input of the adaptive equalizer. Algebraically combining inequalities 1 and 2 and deleting the common term $T_{SW}$ leads to a relationship which should be intuitively obvious in light of the foregoing discussion: $T_F>T_{DEQ}$ is a requirement of the communications protocol which can satisfy both physical requirements of getting all of the useable data through the adaptive equalizer and not inputting noise in the absence of carrier into the device. Simply stated, the flush time must be, at a minimum, of sufficient duration to fill up the equalizer with samples in order to meet both conditions.

Satisfaction of inequality 3 satisfies the physical requirement that adaptive equalizer 28, Viterbi decoder 30, and descrambler 35 be operated for a sufficient period of time to flush all of the useable data on to line 38. In order to accomplish this, adaptive equalizer 28 must continue to be operated and thus delay time $T_{D3}$ makes up for the inadequacy of the flush time provided by the communications protocol in use.

Physically, the preferred embodiment of the present invention, which the inventor believes to be the best mode of practicing same, is constructed using a type TMS320C25 digital signal processing microprocessor currently manufactured by Texas Instruments Corporation. This is used in conjunction with 4 K×16 of 35 nanosecond ROM. The code instructions necessary to implement each of the blocks represented in the drawing figure is an exercise which will be familiar to those skilled in the art of designing and implementing digital signal processing receivers in modems. The non-conventional elements of the DSP receiver, including multiplexer 26, fast carrier detector 20, delay device 48 and gate 50, are all quite simple and their DSP implementations are well known. It should be understood that it is the overall combination, functionally connected as described herein, which constitutes the present invention. Additionally, appreciation of the problem of inadequate flush time and the need of DSP receivers exhibiting end-to-end delay times in excess of previously established standards for flush time which forms a significant portion of the insight which is the foundation for the present invention.

I claim:

1. In a modem receiver having an adaptive signal processing path of the type including a demodulator having a demodulator input and a demodulator output, an adaptive equalizer having an equalizer input, an equalizer output and a delay line output, decoder means connected to said equalizer output for decoding digital data received by said modem receiver, a DSP controller for updating equalizer parameters of said adaptive equalizer during operation of said receiver, and a carrier detector for detecting a carrier signal loss condition at said demodulator input; the improvement comprising in combination:
   a multiplexer interposed between said demodulator output and said equalizer input having a first input connected to said demodulator output, a second input connected to said delay line output and a multiplexer output connected to said equalizer input; and
   selection means for causing said second input of said multiplexer to be connected to said multiplexer output in response to said carrier signal loss condition.

2. The improvement of claim 1 further comprising:
   timer means responsive to said carrier signal loss condition to commence timing of passage of a predetermined interval of time to provide a timed out signal in response to termination thereof; and
   means connecting said timer means to said DSP controller;
   wherein said DSP controller terminates said updating of equalizer parameters in response to said timed out signal.

3. The improvement of claim 1 wherein said decoder means includes means for detecting receipt of a predetermined end of data flag, and said DSP controller terminates said updating of equalizer parameters in response to detection of said predetermined end of data flag by said decoder means.

4. A modem receiver as recited in claim 1 wherein said decoder means comprises a Viterbi decoder.

5. A modem receiver as recited in claim 2 wherein said decoder means comprises a Viterbi decoder.

6. A modem receiver as recited in claim 3 wherein said decoder means comprises a Viterbi decoder.

7. A modem receiver as recited in claim 1 wherein an interpolative filter is interposed between said demodulator output and said first input of said multiplexer.

8. A modem receiver as recited in claim 2 wherein an interpolative filter is interposed between said demodulator output and said first input of said multiplexer.

9. A modem receiver as recited in claim 3 wherein an interpolative filter is interposed between said demodulator output and said first input of said multiplexer.

10. In a modem receiver having an adaptive signal processing path of the type including a demodulator having a demodulator input and a demodulator output, an interpolative filter having a filter input and a filter output, said demodulator output being connected to said filter input, an adaptive equalizer having an equalizer input, an equalizer output and a delay line output, decoder means connected to said equalizer output for decoding digital data received by said modem receiver and operative to detect receipt of a predetermined end of data flag in a data stream provided to said receiver, a DSP controller for updating equalizer parameters of said adaptive equalizer during operation of said receiver, and a carrier detector for detecting a carrier signal loss condition at said demodulator input;
   the improvement comprising in combination:
   a multiplexer interposed between said filter output and said equalizer input having a first input connected to said filter output, a second input connected to said delay line output and a multiplexer output connected to said equalizer input;
   selection means for causing said second input of said multiplexer to be connection to said multiplexer output in response to said carrier signal loss condition;
   timer means responsive to said carrier signal loss condition to commence timing of passage of a predetermined interval of time and to provide a timed out signal in response to termination thereof; and
   means connecting said timer means to said DSP controller;
   wherein said DSP controller terminates said updating of equalizer parameters in response to an occurrence of either said timed out signal or said receipt of said predetermined end of data flag.

11. In a modem receiver having an adaptive signal processing path of the type including
   a demodulator having a demodulator input and a demodulator output characterized by a predetermined demodulator input-to-output delay time $T_{D1}$;
   an adaptive equalizer having an equalizer input, an equalizer output and a delay line output characterized by a predetermined equalizer input-to-delay line output delay time $T_{DEQ}$;
   decoder means connected to said equalizer output for decoding digital data received by said modem receiver characterized by a predetermined decoder input-to-output delay time $T_{D2}$;
   a DSP controller for updating equalizer parameters of said adaptive equalizer during operation of said receiver, and
   a carrier detector for detecting a carrier signal loss condition at said demodulator input;
   the improvement for operating said receiver with a communications protocol having a characteristic predetermined flush time $T_F$ of continued carrier after transmission of a last usable modulated bit when $T_{D1}+T_{DEQ}+T_{D2}$ is greater than $T_F$ comprising in combination:
   a multiplexer interposed between said demodulator output and said equalizer input having a first input connected to said demodulator output, a second input connected to said delay line output and a multiplexer output connected to said equalizer input;
   selection means for causing said second input of said multiplexer to be connected to said multiplexer output a predetermined period $T_{SW}$ after detection of said carrier signal loss condition, TSW being greater than the algebraic difference $T_{D1}+T_{DEQ}-T_F$;

timer means for commencing timing of passage of a predetermined interval of time $T_{D3}$ in response to said carrier signal loss condition; and means connecting said timer means to said DSP controller;

wherein said DSP controller terminates said updating of equalizer parameters in response to said termination of said predetermined interval of time $T_{D3}$ and $T_{D3}$ satisfies the relationship $T_{D3}+T_F>T_{D1}+T_{DEQ}+T_{D2}$.

12. A method of operating an adaptive signal processing path in a receiver of a modem of the type including a demodulator having a demodulator input and a demodulator output, an adaptive equalizer having an equalizer input, an equalizer output and a delay line output, a DSP controller for updating equalizer parameters of said adaptive equalizer during operation of said receiver, said demodulator output being operatively connected to said equalizer input, comprising the steps of:

monitoring for a carrier signal loss condition at said demodulator input;

connecting said demodulator output to said equalizer input in the absence of said carrier signal loss condition and connecting said delay line output to said equalizer input for at least a predetermined period of time subsequent to detection of said carrier signal loss condition; and terminating said updating of equalizer parameters by said DSP controller after passage of said predetermined period of time.

13. A method of operating an adaptive signal processing path in a receiver of a modem of the type including a demodulator having a demodulator input and a demodulator, an adaptive equalizer having an equalizer input, an equalizer output and a delay line output, a DSP controller for updating equalizer parameters of said adaptive equalizer during operation of said receiver, said demodulator output being operatively connected to said equalizer input, comprising the steps of:

monitoring for a carrier signal loss condition at said demodulator input;

connecting said demodulator output to said equalizer input in the absence of said carrier signal loss condition;

connecting said delay line output to said equalizer input in response to said detection of said carrier signal loss condition;

commencing timing of a predetermined time interval in response to said detection of said carrier signal loss condition; and terminating said updating of equalizer parameters by said DSP controller in response to the first occurrence of either termination of said predetermined interval of time or detection of an end-of-data flag at the output of said receiver.

14. A method of operating an adaptive signal processing path in a receiver of a modem of the type including a demodulator having a demodulator input and a demodulator output, an adaptive equalizer having an equalizer input, an equalizer output and a delay line output, and a DSP controller for updating equalizer parameters of said adaptive equalizer during operation of said receiver, comprising the steps of:

monitoring for a carrier signal loss condition at said demodulator input;

connecting said demodulator output to said equalizer input in the absence of said carrier signal loss condition and connecting said delay line output to said equalizer input in response to detection of said carrier signal loss condition; and terminating said updating of equalizer parameters by said DSP controller in response to detection of an end-of-data flag at the output of said receiver.

* * * * *